(12) United States Patent
Krupp et al.

(10) Patent No.: US 10,022,570 B2
(45) Date of Patent: Jul. 17, 2018

(54) PERSONAL ESCAPE DEVICE WITH EDDY CURRENT BRAKING

(71) Applicant: Bailout, LLC, Louisville, KY (US)

(72) Inventors: Benjamin T. Krupp, Wyoming, OH (US); Michael Allen Ragsdale, Cincinnati, OH (US); Patrick Thomas Henke, Hamilton, OH (US); James R. Hendershot, Louisville, KY (US); Troy S. Owens, Cincinnati, OH (US)

(73) Assignee: Bailout, LLC, Louisville, KY (US)

( * ) Notice: Subject to any disclaimer, the term of this patent is extended or adjusted under 35 U.S.C. 154(b) by 0 days.

(21) Appl. No.: 15/600,025

(22) Filed: May 19, 2017

(65) Prior Publication Data
US 2017/0333735 A1    Nov. 23, 2017

Related U.S. Application Data

(60) Provisional application No. 62/339,468, filed on May 20, 2016.

(51) Int. Cl.
*A62B 1/08* (2006.01)
*H02K 49/04* (2006.01)
(Continued)

(52) U.S. Cl.
CPC .............. *A62B 1/08* (2013.01); *H02K 7/104* (2013.01); *H02K 7/1004* (2013.01);
(Continued)

(58) Field of Classification Search
CPC .... A62B 1/00; A62B 1/06; A62B 1/08; A62B 1/10; A62B 1/14; A62B 35/0093;
(Continued)

(56) References Cited

U.S. PATENT DOCUMENTS 3,822,390 A * 7/1974 Janson ................... B65H 59/04
310/104
4,567,963 A * 2/1986 Sugimoto ................ A62B 1/08
182/231
(Continued)

FOREIGN PATENT DOCUMENTS

RU           2209099 C1    7/2003

OTHER PUBLICATIONS

Goberman, I; International Search Report and Written Opinion of the International Searching Authority issued in International Application No. PCT/US2017/033704; dated Aug. 24, 2017; 6 pages.

*Primary Examiner* — Jerry E Redman
(74) *Attorney, Agent, or Firm* — Ulmer & Berne LLP

(57) ABSTRACT

A personal escape device includes a main housing, a shaft, a magnet housing, and a plurality of magnets. The shaft is rotatably coupled with the main housing and is rotatable about a rotational axis. The magnet housing is positioned in the main housing and is coupled with the shaft such that the magnet housing rotates together with the shaft. The plurality of magnets is coupled with the magnet housing such that the plurality of magnets rotates together with the magnet housing. The stator assembly is coupled with the main housing and surrounds the magnet housing. The stator assembly and the magnet housing are radially spaced from each other to define an air gap therebetween.

18 Claims, 13 Drawing Sheets

(51) Int. Cl.
 H02K 7/104 (2006.01)
 H02K 7/10 (2006.01)
 H02P 3/04 (2006.01)
 H02K 16/00 (2006.01)

(52) U.S. Cl.
 CPC ......... H02K 49/043 (2013.01); *H02K 16/005* (2013.01); *H02P 3/04* (2013.01)

(58) Field of Classification Search
 CPC ...... H02K 7/104; H02K 49/04; H02K 49/043; H02K 49/046; H02K 16/005; H02P 3/04; B66D 5/02
 See application file for complete search history.

(56) References Cited

U.S. PATENT DOCUMENTS

| | | | | |
|---|---|---|---|---|
| 4,938,435 A * | 7/1990 | Varner | ....................... | A62B 1/08 182/231 |
| 5,711,404 A * | 1/1998 | Lee | ................... | A63B 21/0051 188/158 |
| 7,528,514 B2 * | 5/2009 | Cruz | ....................... | F16D 27/01 310/103 |
| 8,522,918 B1 * | 9/2013 | Al-Wasis | ........... | A62B 35/0006 182/193 |
| 9,016,435 B2 | 4/2015 | Allington et al. | | |
| 9,153,115 B1 * | 10/2015 | Ulner | ................. | G08B 21/0446 |
| 9,205,285 B2 * | 12/2015 | Jones | ....................... | A62B 1/10 |
| 9,211,426 B2 * | 12/2015 | Baum | ..................... | A62B 35/00 |
| 9,704,370 B2 * | 7/2017 | Ulner | ................. | G08B 21/0446 |
| 9,827,451 B2 * | 11/2017 | Renton | ..................... | A62B 1/10 |
| 2006/0105877 A1 * | 5/2006 | Bornchen | ................ | H02K 7/10 475/149 |
| 2008/0105503 A1 * | 5/2008 | Pribonic | .............. | H02K 49/046 188/267 |
| 2009/0159373 A1 * | 6/2009 | Hartman | .................. | A62B 1/08 187/350 |
| 2009/0178887 A1 * | 7/2009 | Reeves | ..................... | A62B 1/10 182/239 |
| 2009/0211846 A1 * | 8/2009 | Taylor | ................ | A63B 69/0048 182/231 |
| 2010/0065373 A1 * | 3/2010 | Stone | ....................... | A62B 1/10 182/233 |
| 2010/0282541 A1 * | 11/2010 | Renton | ..................... | A62B 1/18 182/234 |
| 2010/0308149 A1 * | 12/2010 | Allington | ................. | A62B 1/08 242/379 |
| 2011/0147125 A1 * | 6/2011 | Blomberg | ............ | H02K 49/043 182/232 |
| 2013/0186721 A1 * | 7/2013 | Bogdanowicz | ...... | H02K 49/043 188/267 |
| 2013/0327242 A1 * | 12/2013 | Bernier | ..................... | B61H 9/02 104/113 |
| 2016/0296771 A1 * | 10/2016 | Malcolm | .................. | A62B 1/14 |
| 2017/0274261 A1 * | 9/2017 | Allington | ................. | A62B 1/08 |
| 2017/0328424 A1 * | 11/2017 | Allington | ................. | F16D 59/00 |

* cited by examiner

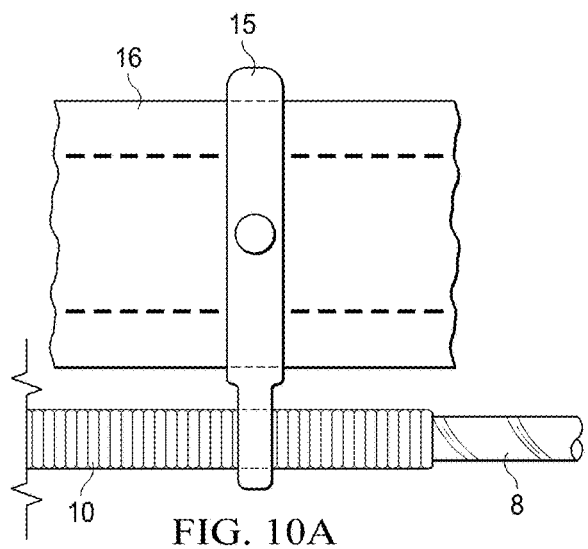
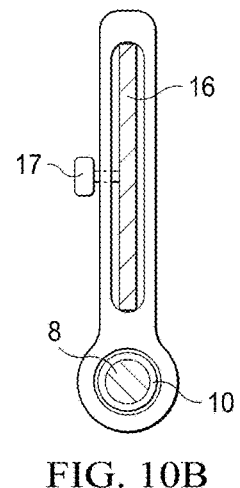
FIG. 10A    FIG. 10B
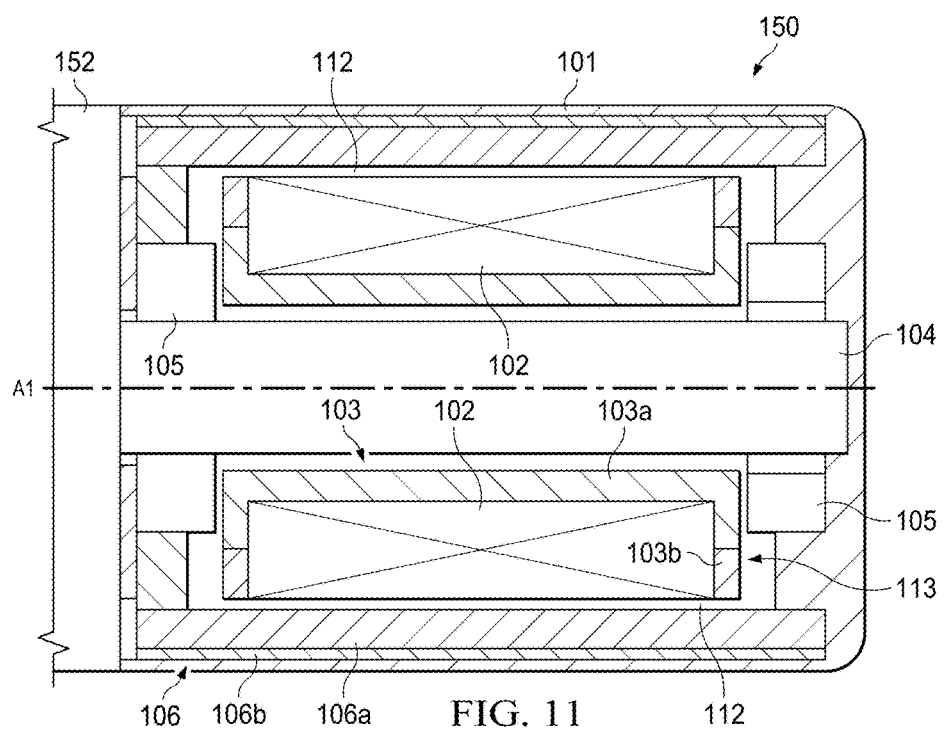
FIG. 11

US 10,022,570 B2

PERSONAL ESCAPE DEVICE WITH EDDY CURRENT BRAKING

REFERENCE TO RELATED APPLICATION

This application claims priority of U.S. provisional patent application Ser. No. 62/339,468, entitled Personal Escape Device with Eddy Current Braking, filed May 20, 2016, and hereby incorporates this provisional patent application by reference herein in its entirety.

BACKGROUND

Fires and other emergencies can occur in buildings and other structures that have occupants trapped at high elevations. In some emergency situations, conventional paths of egress, such as interior stairwells or fire escapes become blocked with fire or smoke, or are otherwise overloaded with evacuating occupants, thereby impeding the ability of other occupants to exit the structure in a timely fashion. Further, other occupants may not be able to use certain paths of egress due to physical impairments. In such cases, occupants that cannot exit the structure are forced to wait for rescue. Thus, there is a need for a reliable device for enabling the controlled descent of persons of a range of ages, weights, and abilities from high elevations during emergency situations.

SUMMARY

In accordance with one embodiment, a personal escape device comprises a main housing, a shaft, a magnet housing, a plurality of magnets, and a stator. The shaft is rotatably coupled with the main housing and is rotatable about a rotational axis. The magnet housing is positioned in the housing and is coupled with the shaft such that the magnet housing rotates together with the shaft. The plurality of magnets is coupled with the magnet housing such that the plurality of magnets rotates together with the magnet housing. The stator assembly is coupled with the main housing and surrounds the magnet housing. The stator assembly and magnet housing are radially spaced from each other to define an air gap therebetween. Each magnet has a flux density. At least a portion of the magnet housing is interposed between each magnet and an adjacent magnet of the plurality of magnets. The portion of the magnet housing that is interposed between each magnet and an adjacent magnet of the plurality of magnets is configured to transmit substantially the entirety of the flux density from each magnet to the stator A personal escape device comprises a main housing, a shaft, a magnet housing, a plurality of magnets, and a stator assembly. The shaft is rotatably coupled with the main housing and is rotatable about a rotational axis. The magnet housing is positioned in the housing and is coupled with the shaft such that the magnet housing rotates together with the shaft. The plurality of magnets is coupled with the magnet housing such that the plurality of magnets rotates together with the magnet housing. The stator assembly is coupled with the main housing and surrounds the magnet housing. The stator assembly and magnet housing are radially spaced from each other to define an air gap therebetween. Each magnet of the plurality of magnets has an axis of polarization. Each magnet of the plurality is arranged such that the axis of polarization is oriented tangentially with respect to the axis of rotation of the shaft.

A personal escape device comprises a main housing, a shaft, a magnet housing, a plurality of magnets, a stator assembly, a pulley, and a cord. The shaft is rotatably coupled with the main housing and is rotatable about a rotational axis. The magnet housing is positioned in the housing and is coupled with the shaft such that the magnet housing rotates together with the shaft. A plurality of magnets is coupled with the magnet housing such that the plurality of magnets rotates together with the magnet housing. The stator assembly is coupled with the main housing and surrounds the magnet housing. The stator assembly and magnet housing are radially spaced from each other to define an air gap therebetween. The pulley is attached to the shaft. The cord is routed at least partially around the pulley. Rotation of the pulley facilitates dispensation of a portion of the cord from the pulley. Each magnet of the plurality of magnets has an axis of polarization. Each magnet of the plurality is arranged such that the axis of polarization is oriented tangentially with respect to the axis of rotation of the shaft. At least a portion of the magnet housing is interposed between each magnet and an adjacent magnet of the plurality of magnets.

BRIEF DESCRIPTION OF THE DRAWINGS

The present disclosure will be more readily understood from a detailed description of some example embodiments taken in conjunction with the following figures:

FIGS. 10a-10b depict an example routing clip for assisting with the placement of the protective channel relative to a user.

FIG. 11 is a cross-sectional view taken along the line 11-11 in FIG. 15, in accordance with an alternative embodiment.

DETAILED DESCRIPTION

Figure 1:
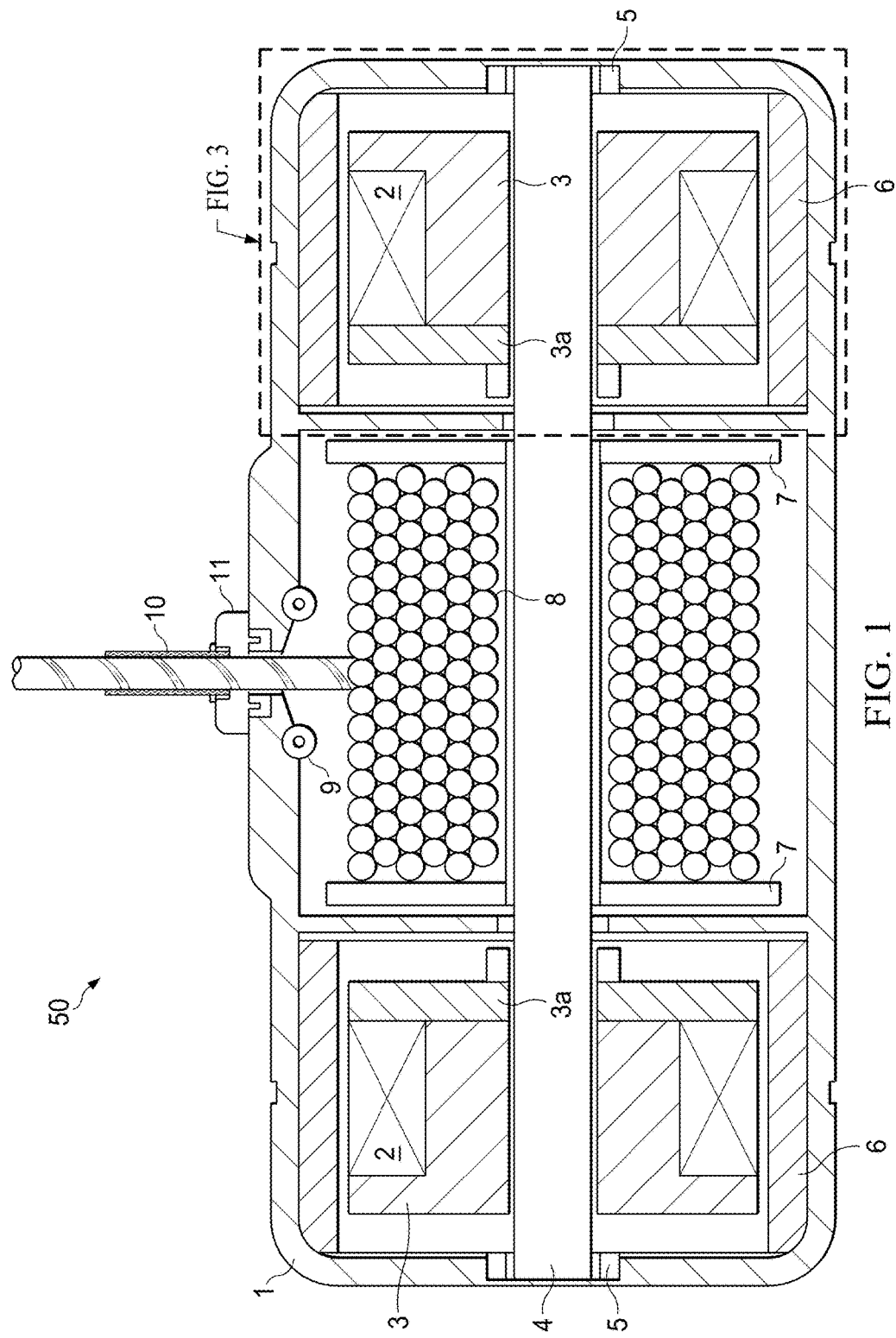
FIG. 1 depicts a cross-sectional view of a personal escape device taken along the line 1-1 in FIG. 2, in accordance with one non-limiting embodiment.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments", "some embodiments", "one embodiment", "some example embodiments", "one example embodiment", or "an embodiment" means that a particular feature, structure, or characteristic described in connection with any embodiment is included in at least one embodiment. Thus, appearances of the phrases "in various embodiments", "in some embodiments", "in one embodiment", "some example embodiments", "one example embodiment", or "in an embodiment" in places throughout the specification are not necessarily all referring to the same embodiment. Furthermore, the particular features, structures or characteristics may be combined in any suitable manner in one or more embodiments.

Personal escape devices in accordance with the present disclosure can be used by any of a variety of users, such as men, women, children, and physically disabled persons, to descend in a controlled and secure manner from structures. Example structures can include, without limitation, office buildings, homes, bridges, among other types of equipment (i.e., cranes, window washing equipment, and the like). Other example uses of the personal escape devices can include, for example, a high rescue kit (thereby avoiding large equipment), seat belts or other devices that resist occupant movement during a crash (e.g., in a school bus), deep space evacuation, a self-belay device for climbing, lowering lifeboats from a cruise ship, retrofit of an existing winch, lowering heavy articles (e.g., a piano) from above ground (e.g., an apartment), exercise training equipment (e.g., replacing resistance band training), hospital patent recovery (e.g., traction or can safely lower suspended patient from ceiling to ground), escape device that is easily mountable to a window or other egress point for home use, climbing equipment, riggers, helicopter deployment (e.g., replacing fast rope), fire rescue, military building clearing, drone escape (e.g., deployment of a drone that can anchor itself to a structure and deliver a personal escape device to a trapped individual), window washing, high rise tower maintenance, windmill maintenance, evacuation for inoperable ski lifts, or the like.

The personal escape device can be sized to be mobile and easily handled by its user. The device can be anchored in a variety of different positions and elevations, thereby giving users flexibility and ease of use. While being used during a descent, the user of the personal escape device can descend hands-free in a controlled manner. In some embodiments, a user-controlled braking mechanism is provided to allow the user to optionally come to a complete stop.

A personal escape device in accordance with the present disclosure can include a housing within which a spool is rotatably mounted. The primary spool can extend along and rotate about a central axis. A personal escape device can further include an elongated cord that is wound around the spool, having its proximal end affixed to the spool and the distal end extending through a port in the housing. The cord can be constructed from any suitable material, or combination of materials, such as wire rope, synthetic rope, core and sheath rope, and so forth. An anchor assembly can extend from, or otherwise be coupled to, the distal end of the cord. The anchor assembly can allow for the distal end to be coupled to a bracing object, such as a door, a door frame, a structural beam or pillar, or other secure object of a structure. Such coupling to the bracing object can be temporary (i.e., attached to the bracing object at the time of use) or permanently or semi-permanently coupled to the bracing object.

Personal escape devices in accordance with the present disclosure can include an unwind control assembly, which generally controls the rate at which the cord exits from the housing during a descent. Such an unwind control assembly can utilize eddy current braking to control or regulate the speed of the spool during an unwinding event. As described in more detail below, one or more magnets can be coupled to the spool and arranged in a radial fashion, such that rotation of the spool rotates the magnets about the central axis. As the magnets rotate within a ferrous and/or non-ferrous ring, eddy currents are created. The eddy currents, in turn, yield torque values to provide a braking force to the spool and slow the unwinding of the cord.

A device in accordance with the present disclosure can be employed by a user to escape from a structure in times of emergencies, or for any other suitable use. To escape from a building, for example, the anchor assembly is affixed to a structurally secure object or other type of connection point of the building. The user can then open or break a window or other type of opening or egress point. The user, once attached to the personal escape device (i.e., via a harness, net, platform, pack, or other assembly), exits through the opening. In response to the gravity-induced force on the distal end of the cord, the cord exits through the port in a controlled manner and the spool unwinds. As the spool rotates, the magnets rotate within the ferrous and/or non-ferrous ring. Eddy current braking impedes the rotation of the spool to permit the spool to rotate at a controlled rate, thereby allowing the user coupled to the spool to descend at a controlled rate. The controlled rate can vary, but in some embodiments the descent rate is less than about 1 m/s. In some embodiments, the descent rate is less than about 2 m/s. In some embodiments, the descent rate is less than about 3 m/s. In some embodiments, the descent rate is less than about 4 m/s. As described in more detail below, in addition to the eddy current brake system, other types of brake systems can be included, such as hand-operated braking systems, in order to provide the user with additional means for controlling the rate of descent and/or stopping the descent.

Figure 2:
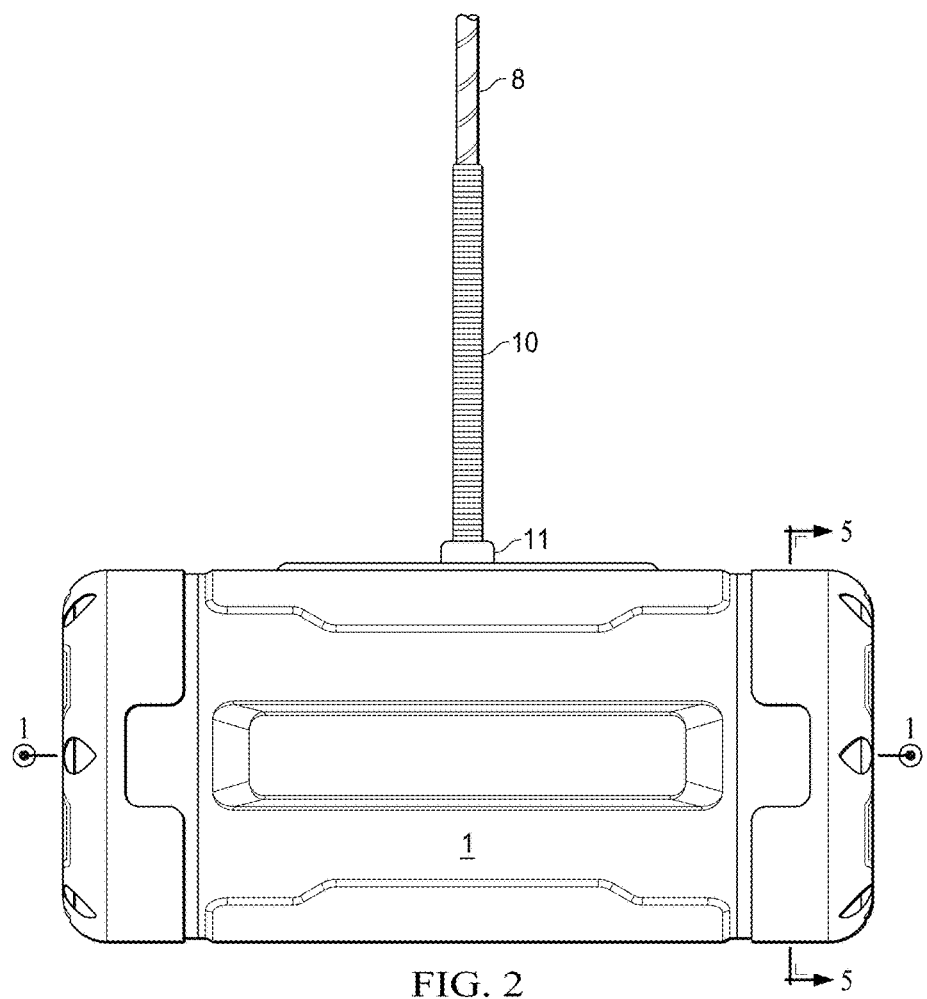
FIG. 2 depicts a side view of the personal escape device of FIG. 1.

FIG. 1 depicts a cross-sectional view of an example personal escape device 50 in accordance with one non-limiting embodiment. FIG. 2 depicts a side view of the personal escape device of FIG. 1. Referring to FIGS. 1-2, the personal escape device 50 has a housing 1 that can be manufactured from substantially rigid, formable or moldable materials, such as fiberglass, plastics, rigid metals, or other suitable materials. The housing material can be of sufficient strength to withstand the forces applied by the weight of the payload (i.e., the user) during deployment. Payout rollers 9 can be positioned within the housing 1 proximate to a payout port 11. In some embodiments, the personal escape device 50 also includes a protective channel 10 positioned proximate to the payout port 11.

A shaft 4 is disposed within the housing 1 and is rotatable about a central axis. A cord 8 is wound around the shaft 4, with its proximal end affixed to the shaft 4 and its distal end routed through the payout port 11. The distal end can be coupled to an anchoring assembly, such as a hook or a carabiner, among a wide variety of other anchoring devices, as discussed above. Spool flanges 7 can extend radially from the shaft 4 and be positioned to maintain the lateral placement of the cord 8 along the shaft 4 during the winding and unwinding of the cord 8. The length of the cord 8 can vary depending upon the height of the structure with which the personal escape device 50 is intended to be used. Furthermore, the sizing and spacing of the spool flanges 7 can vary based on the size and length of the cord 8 that is wound around the shaft 4.

A magnet housing 3 is positioned within the housing 1 and coupled to the shaft 4, such that rotation of the shaft 4 rotates the magnet housing 3. In the illustrated embodiment, magnet housings 3 are each positioned proximate to lateral ends of the shaft 4. In some embodiments a magnet housing cap 3*a* is coupled to the magnet housing 3, and one or more magnets 2 are coupled to the magnet housing 3. In the illustrated embodiment, the magnets 2 are coupled around the outer periphery of the magnet housing 3. Thus, rotation of the shaft 4, which can be caused by the unwinding cord 8, causes the magnets 2 to rotate. To facilitate ease of rotation of the shaft 4 relative to the housing 1, roller bearings 5 can be utilized.

Conductive rings 6 are positioned within the housing 1 to surround the magnet housing 3 such that rotation of the magnets 2 proximate to the rings 6 generates eddy currents. The eddy currents generally are induced by the relative movement of the magnets 2 and rings 6 through electromagnetic induction. The eddy currents create a drag force that will oppose the motion of the magnets 2 proportional to its velocity. The rings 6 can be ferrous, non-ferrous, or combinations thereof. For example, in some non-limiting embodiments the rings 6 are copper, aluminum, or steel. The wall thickness of the ring 6 can depend on the type of material, the size of the personal escape device 50, and/or the intended use, among other factors. In some embodiments, however, the rings 6 are copper and can have a lateral width within the range of about 2 inches to about 4 inches, a diameter within the range of about 2 inches to 4 inches, and a wall thickness within the range of about 0.2 inches to 1 inch. In some embodiments, however, the rings 6 are copper and can have a width of about 2.25 inches to about 4 inches, a diameter of about 3.18 inches, and a wall thickness of about 0.25 inches. Depending on the material used, various dimensions can be increased or decreased to achieve the desired performance without departing from the scope of the present disclosure.

Figure 3:
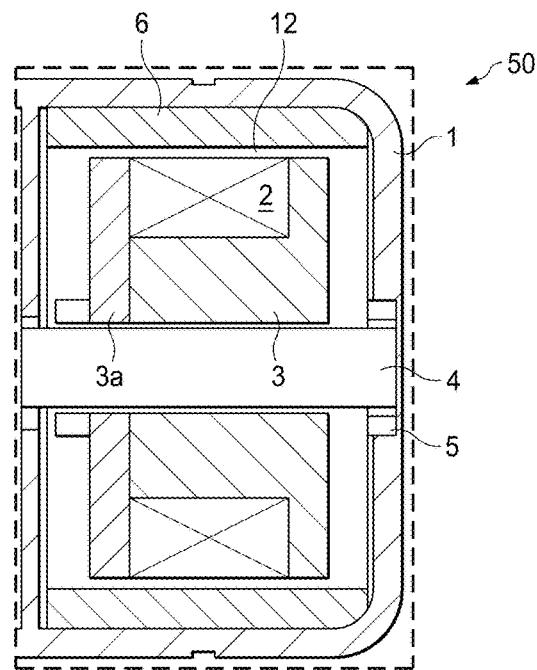
FIG. 3 depicts an enlarged cross-sectional view of the encircled portion of FIG. 1 depicting a lateral end of the personal escape device of FIG. 1.
Figure 4:
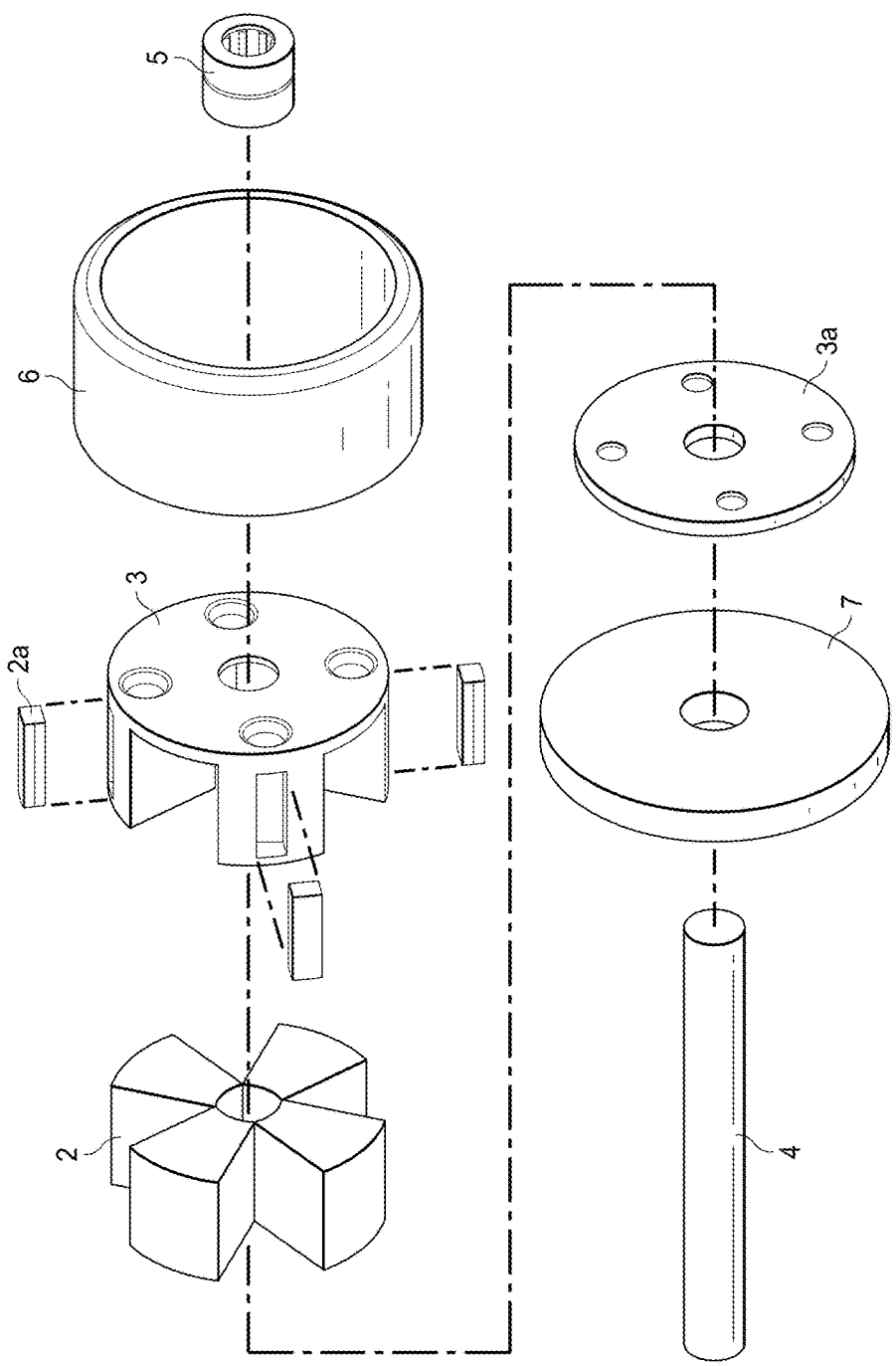
FIG. 4 is an exploded view of FIG. 3.

FIG. 3 depicts an enlarged cross-sectional view of a lateral end of the personal escape device 50 of FIG. 1. FIG. 4 is an exploded view of FIG. 3. As shown in FIG. 3, an air gap 12 is defined between an inner surface of the ring 6 and the magnets 2 such at that the magnets 2 do not contact the ring 6. In some embodiments, the air gap 12 is less than 0.10 inches. The shaft 4 can be attached to the spool flange 7 which, in combination with an oppositely mounted spool flange 7 (FIG. 1), creates the cavity for the cord 8. FIG. 4 also depicts supporting magnets 2*a* that are housed in the magnet housing 3 and are each positioned between adjacent magnets 2. The shaft 4, the spool flange 7, the magnet housing cap 3*a*, the magnets 2, the magnet housing 3, and the supporting magnets 2*a* can rotate relative to the ring 6, with the lateral end of the shaft 4 engaged with the bearing 5.

Figure 5:
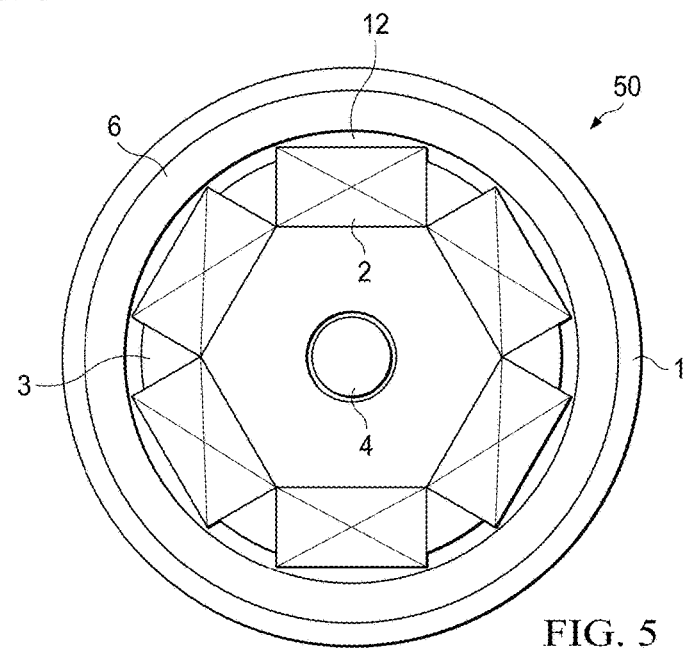
FIG. 5 depicts a cross-sectional view taken along the line 5-5 in FIG. 2.

FIG. 5 depicts a cross-sectional view of a lateral end of the personal escape device 50 shown in FIG. 1 taken orthogonal to the central axis. As illustrated, the magnets 2 and the magnet housing 3 are centrally positioned within the ring 6. The magnets 2 are positioned to provide an air gap 12 between the ring 6 and magnets 2.

Figure 6:
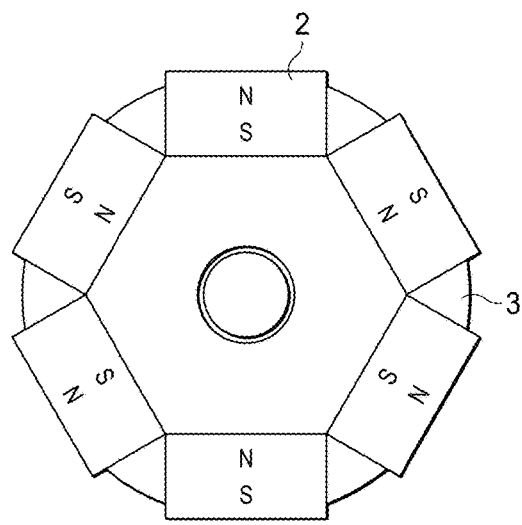
FIG. 6 depicts an example arrangement of magnets that are coupled to a magnet housing.

FIG. 6 depicts an example arrangement of the magnets 2 that are coupled to the magnet housing 3. In the illustrated embodiment, six magnets are used and are arranged in alternating poles in a radial fashion. The axis of polarity in this arrangement is radial to the axis of rotation of the shaft. Other arrangements of magnets can be used without departing from the scope of the present disclosure.

Figure 7:
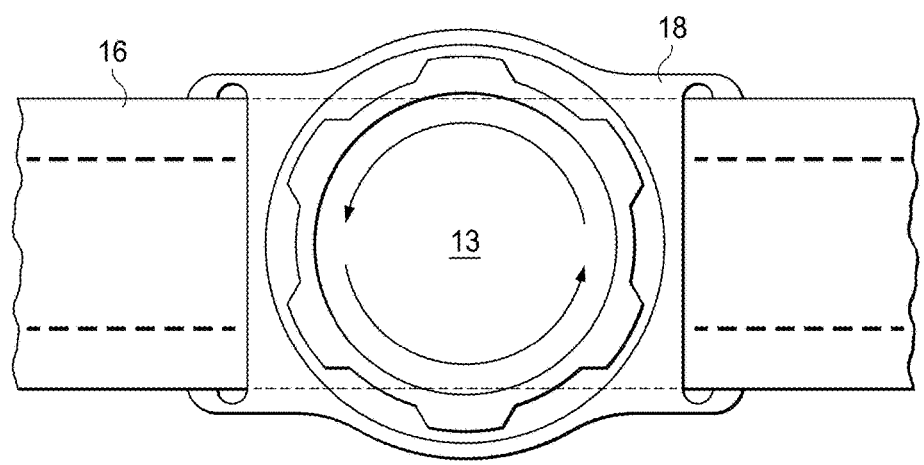
FIG. 7 depicts an example line feed housing that can be associated with a personal escape device.

FIG. 7 depicts a line feed housing 18 that can be associated with the personal escape device 50. The line feed housing 18 can be positioned proximate to the payout port 11, such that the cord 8 unwinding from the shaft 4 is routed through the line feed housing 18. The line feed housing 18 can be integral with the housing 1 or can be a separate component (as illustrated) that is affixed to a harness strap 16, for example. In some embodiments, the line feed housing 18 houses a hand brake 13. The hand brake 13 can be provided using any suitable configuration, such as a lever, a rotatable wheel (as illustrated), or a push button, among other configurations.

Figure 8:
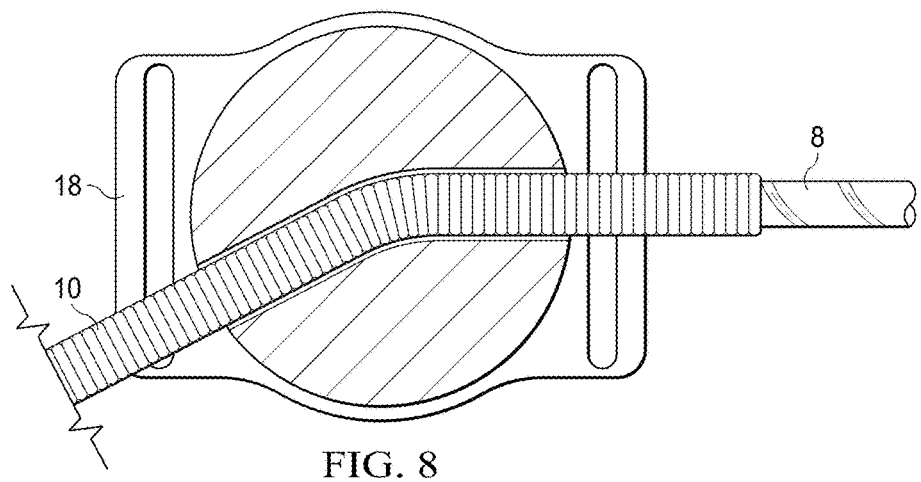
FIG. 8 depicts another embodiment of a line feed housing.

FIG. 8 depicts another embodiment of the line feed housing 18. In this embodiment, a protective channel 10 is routed through the line feed housing 18. Such line feed housings can be used, for example, in connection with certain types of harnesses in which particular routing the cord 8 is desired.

Figure 9:
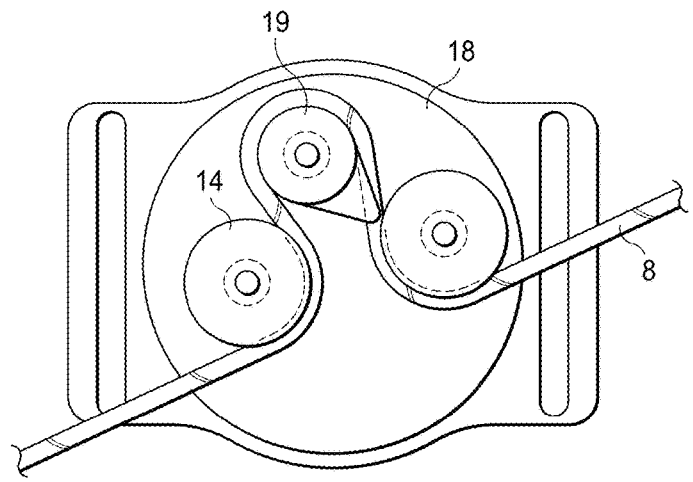
FIG. 9 depicts a cross-sectional view of an example braking mechanism in accordance with one non-limiting embodiment.

FIG. 9 depicts a cross-sectional view of an example braking mechanism in accordance with one non-limiting embodiment. The braking mechanism includes rollers 14 through which the cord 8 is routed. A cam 19 is optionally rotated by a user of the personal escape device, such that rotation of the cam 19 applies a frictional force to the cord 8, thereby providing mechanical braking. Actuation of the cam 19 during a descent can, for instance, cause the user to come to a stop. When the cam 19 is subsequently rotated to remove the frictional force, the user can resume the descent.

FIG. 10*a* depicts an example routing clip 15 for assisting with the placement of the protective channel 10 relative to a user. FIG. 10*b* depicts a side view of the routing clip 15. The routing clip 15 can be affixed to the harness strap 16 using a strap anchoring knob 17. The strap anchoring knob 17 can be turned to apply pressure on the harness strap 16 preventing the routing clip 15 from moving relative to the harness strap 16. The protective channel 10 is routed through the routing clip 15, thereby preventing relevant movement of protective channel 10 and assisting with the guiding of the cord 8.

Figure 12:
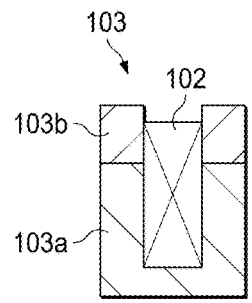
FIG. 12 is a cross-sectional view taken along the line 12-12 in FIG. 15.
Figure 14:
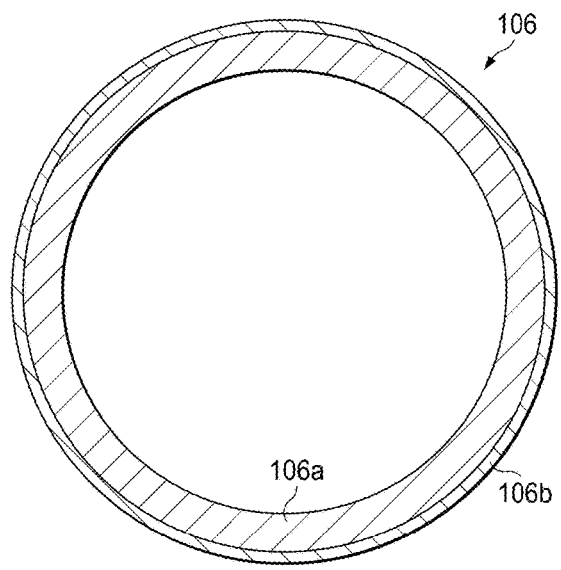
FIG. 14 is a cross-sectional view taken along the line 14-14 in FIG. 15, with certain components removed for clarity of illustration.
Figure 13:
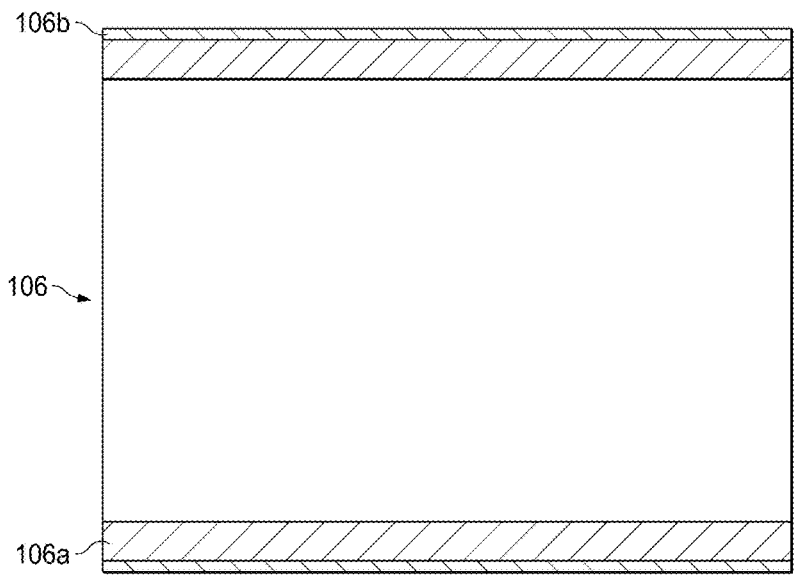
FIG. 13 is a cross-sectional view depicting a stator assembly of the personal escape device of FIG. 11, with certain components removed for clarity of illustration.

An alternative embodiment of a personal escape device 150 is illustrated in FIGS. 11-21 and is similar to or the same as in many respects as the personal escape device 50 illustrated in FIGS. 1-10B. For example, as illustrated in FIG. 11, the personal escape device 150 can include a main housing 101 and a shaft 104 that is rotatable with respect to the main housing 101 about a rotational axis A1 and journalled with respect to the main housing 101 by a pair bearings 105. A magnet housing 103 (i.e., a rotor assembly) can be positioned within the main housing 101 and can be coupled to the shaft 104, such that rotation of the shaft 104 rotates the magnet housing 103. The magnet housing 103 can be a two-piece arrangement that comprises a hub 103a and a rotor 103b that are formed of a metal. As illustrated in FIGS. 11 and 12, the hub 103a and the rotor 103b can cooperate to retain a plurality of magnets 102 that rotate together with the magnet housing 103. The hub 103a can be formed of a non-ferrous material. In one embodiment, the magnets 102 can be permanent magnets, such as NE 52 magnets, for example. It is to be appreciated that the magnets 102 can be formed via injection molding, bonding, hot press molding, three dimensional printing, or any of a variety of suitable alternative methods. Referring now to FIGS. 11, 13 and 14, a stator assembly 106 (i.e., a plurality of conductive rings) can include a stator 106a and a back iron 106b that overlies the stator 106a such that the back iron 106b is sandwiched between the stator 106a and the main housing 101. The stator assembly 106 can be positioned within the main housing 101 and can surround the magnet housing 103.

Referring again to FIG. 11, the magnet housing 103 and the stator 106 can be radially spaced from each other to define an air gap 112 therebetween such that rotation of the magnet housing 103 correspondingly rotates the magnets 102 with respect to the conductive rings 106. In one embodiment, the air gap 112 can be less than about 0.1 inches. The stator 106a can be formed of a non-ferrous metal such as aluminum or copper, for example, or other material that facilitates generation of eddy currents when the magnet housing 103 rotates with respect to the stator assembly 106 thereby imparting a braking force that opposes rotation of the magnet housing 103. The back iron 106b can be formed of a ferrous material and can have a thickness that corresponds to the magnetic mass within the stator assembly 106. In one embodiment, the back iron 106b can be formed of a rolled perforated sheet of ferrous material. In such an embodiment, a cooling fluid (e.g., water) can be imparted to the rolled perforated sheet and can flow through the perforations to facilitate cooling of the stator assembly 106. In other embodiments, cooling fluid (e.g., water) can reside in the air gap 112 to facilitate cooling of the stator assembly 106.

Figure 15:
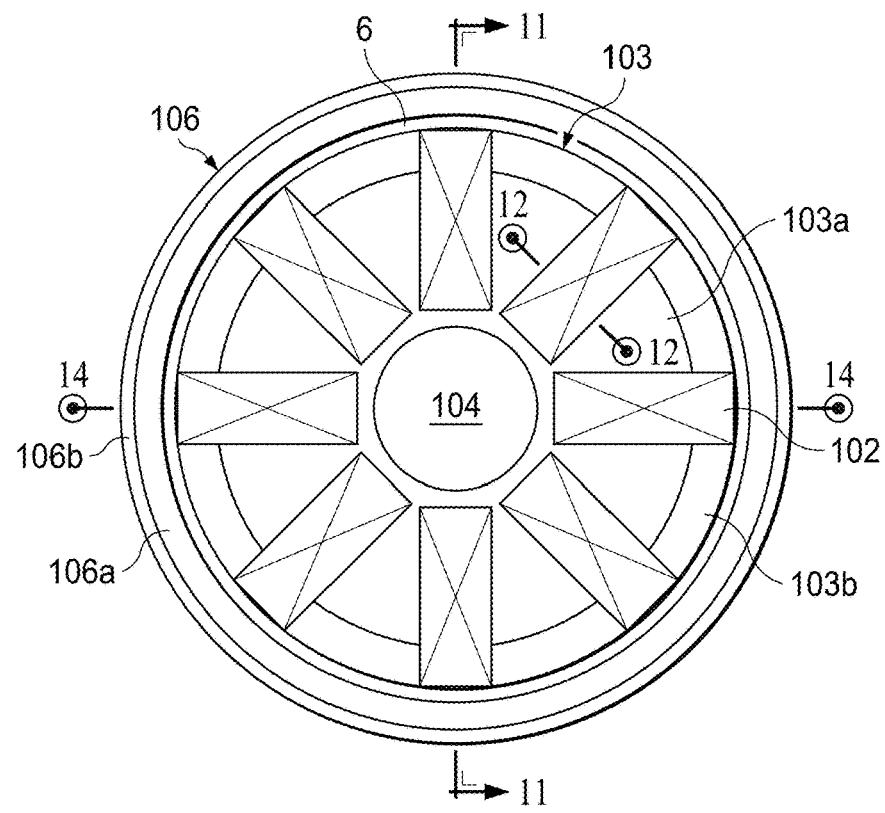
FIG. 15 is a cross sectional view depicting the personal escape device of FIG. 11.
Figure 16:
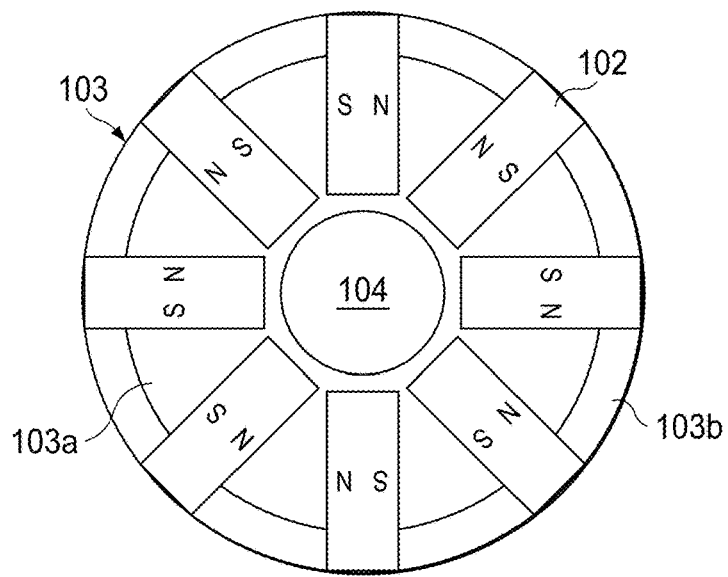
FIG. 16 is a cross sectional view depicting a magnetic housing depicting the personal escape device of FIG. 11.

However, as illustrated in FIGS. 15 and 16, the arrangement of the magnets 102 and the interaction between the magnets 102 and the magnet housing 103 can be different from the personal escape device 50 illustrated in FIGS. 1-10B. For example, as illustrated in FIG. 15, the magnets 102 are arranged with respect to the shaft 104 such that their axis of polarization is tangential to the rotational axis A1. The axis of polarization can be understood to mean the axis that intersects the north and south poles of the magnet. A portion of each of the hub 103a and the rotor 103b can be interposed between each magnet 102 and an adjacent magnet 102 thereby providing a salient pole arrangement that focuses the magnetic flux into the stator 106a. The portion of the magnet housing 103 that is interposed between each magnet 102 and the adjacent magnet 102 can be configured to transmit the entirety of the flux density from each magnet 102 to the stator assembly 106. In one embodiment, the portion of the magnet housing 103 that is interposed between each magnet 102 can have sufficient thickness, mass and permeability to transmit the entirety of the flux density from the magnet 102 to the stator assembly 106. Referring now to FIG. 16, the magnets 102 can be arranged such that the north-south pole directions of each magnet 102 align between adjacent magnets 102. In such an arrangement, the back iron 106b can act as a return path for the magnetic flux such that it circulates back into the stator assembly 106 allowing for the eddy current to increase in strength thus providing a much larger torque curve than conventional arrangements.

It is to be appreciated that arranging the magnets 102 axially as described can impart a rotating radial flux pattern which can be more effective at imparting a braking force than conventional arrangements that impart an axial reciprocating flux pattern. It is also to be appreciated that the magnets 102 and the magnet housing 103 can cooperate to form any of a variety of rotor configurations, such as SPM and IPM rotor configurations which can include a radial pole arrangement, a bread loaf arrangement, a radial and salient arrangement, an outside poles arrangement, a spoke IPM arrangement, a V-pole IPM arrangement or the like.

It is to be appreciated the thickness of the air gap 112, the thickness of the stator 106a, the thickness of the back iron 106b, the quantity and arrangement of magnet(s) 102, and/or the gausing strength and polarity of the magnets 102 can be selected to achieve a more compact design that yields higher weight capacities than conventional arrangements. For example, the thickness of the hub 103a, the rotor 103b, the stator 106a, and the back iron 106b can be selected to achieve a braking force to suit a particular application (e.g., fire and rescue) for the personal escape device 150. It is also to be appreciated that the arrangement of the magnets 102, magnet housing 103, and the stator assembly 106 disclosed herein can result in a lighter, more compact, more portable design that is more readily available for personal use and that provides higher eddy currents (e.g., higher braking force) than conventional arrangements.

Figure 17:
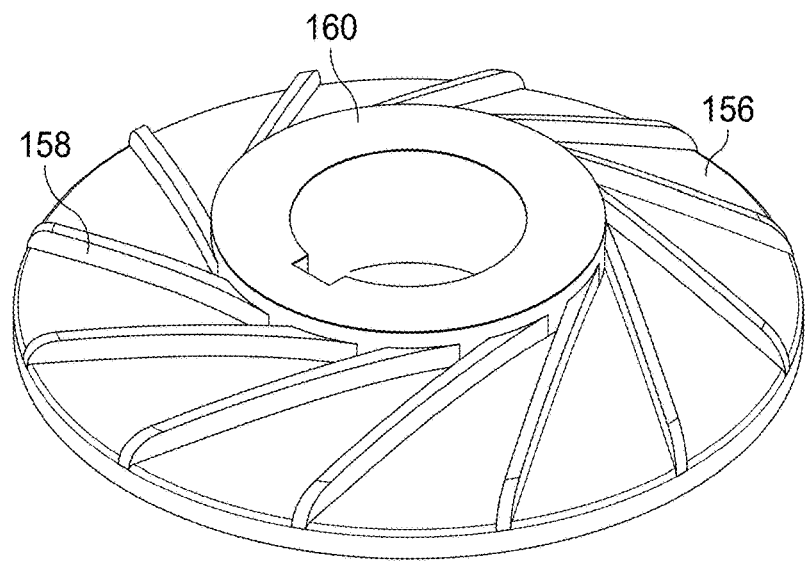
FIG. 17 is a perspective view depicting a disc member of the personal escape device of FIG. 11.
Figure 18:
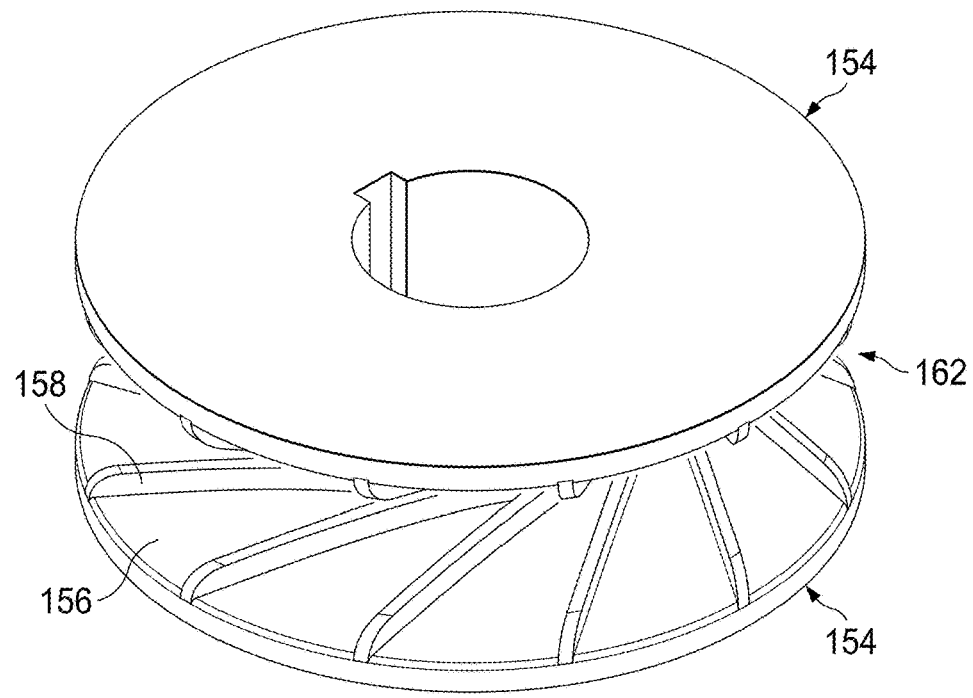
FIG. 18 is a perspective view depicting a pair of the disc members of FIG. 17.
Figure 19:
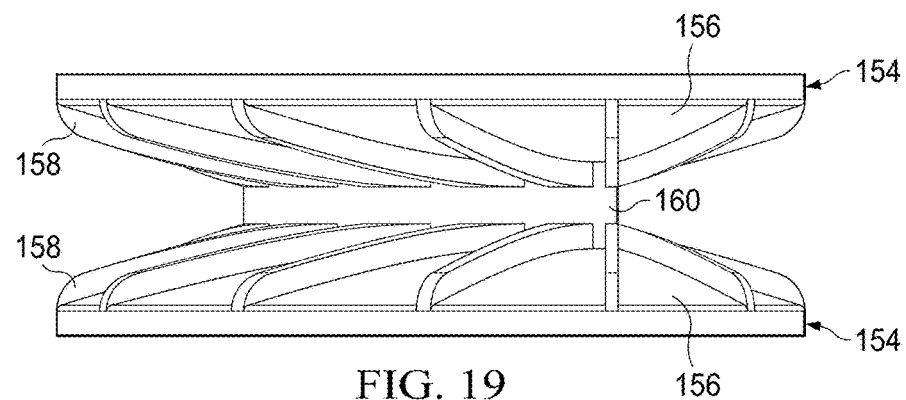
FIG. 19 is a side view of the pair depicting the disc members of FIG. 17.

Referring again to FIG. 11, a pulley 152 can be attached to the shaft 104 such that rotation of the pulley 152 correspondingly rotates the magnet housing 103 (via the shaft 104). The pulley 152 can comprise a pair of disc members 152 (FIGS. 18 and 19). As illustrated in FIG. 17, one of the disc members 152 is illustrated and can be understood to be representative of the other disc member 152 in the pair. Each disc member 152 can include an internal surface 156 having lateral elongated projections 158 extending upwardly therefrom. The lateral elongated projections 158 can extend substantially tangentially from a central hub 160. The internal surface 156 of the disc members 152 can be substantially convex shaped such that the profile of the lateral elongated projections 158 are crowned as they extend away from the central hub 160. As illustrated in FIGS. 18 and 19, the disc members 152 can be sandwiched together and arranged with the internal surfaces 156 facing each other such that the disc members 152 cooperate to define a V-shaped groove 162.

Figure 20:
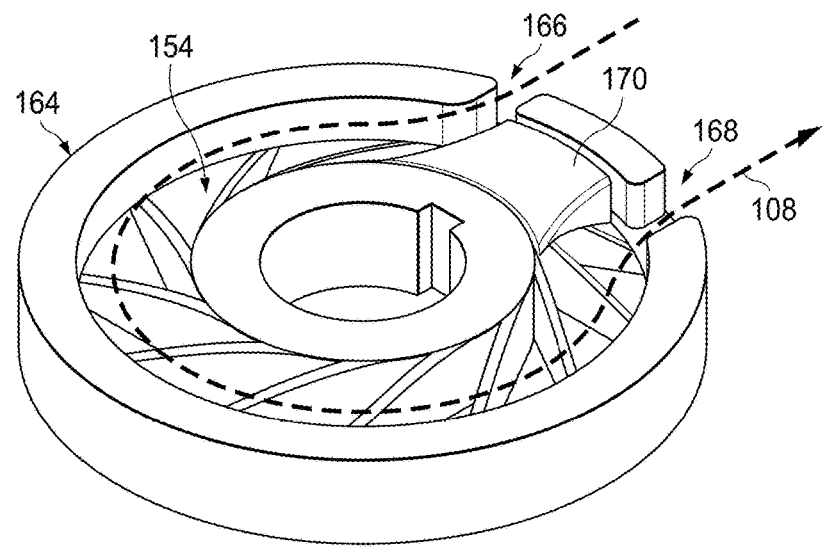
FIG. 20 is a perspective view depicting a pulley of the personal escape device of FIG. 11 with certain components removed for clarity of illustration.
Figure 21:
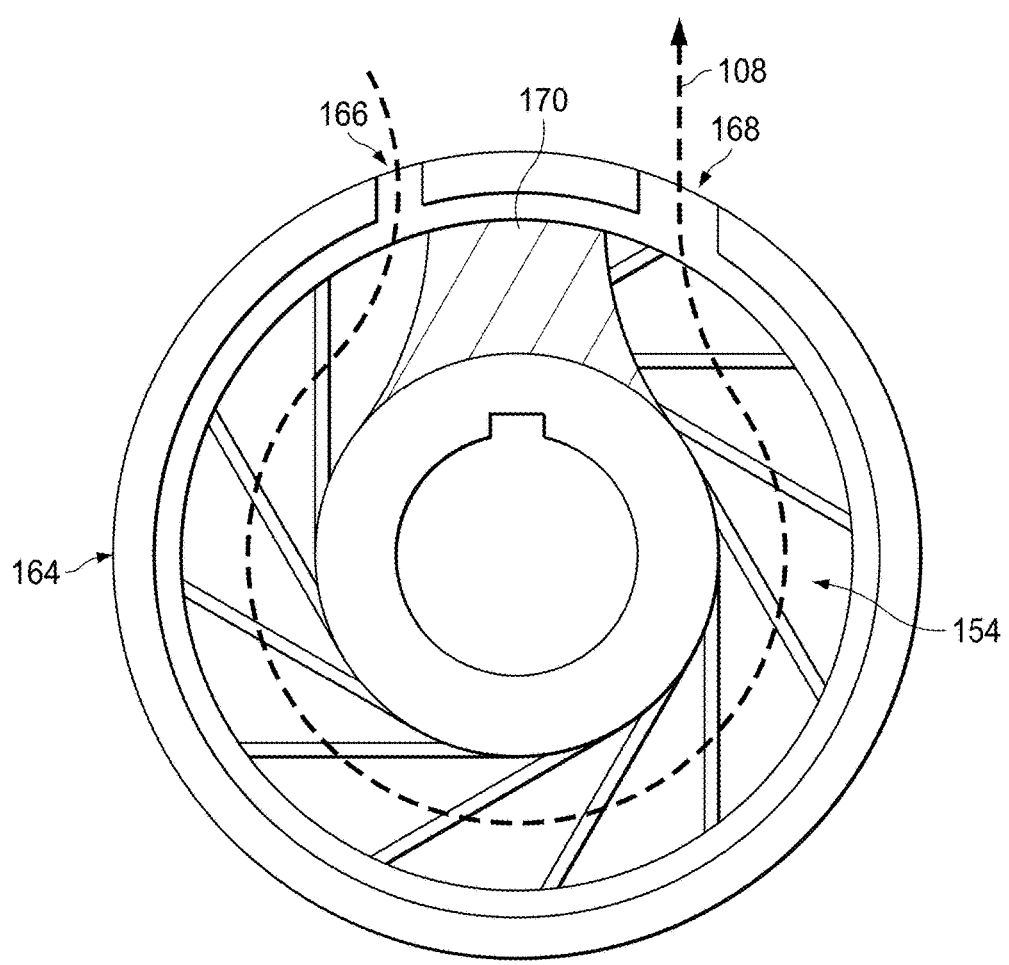
FIG. 21 is an upper view depicting the pulley of FIG. 20.

Referring now to FIGS. 20 and 21, the pulley 152 can include a pulley housing 164 that houses the disc members 152, one of which has been removed for clarity of illustration. The pulley housing 164 can define an input port 166 and an output port 168 for a cord 108. The cord 108 can be routed through the input port 166, around the central hub 160, and out of the output port 168 such that the cord 108 is only partially wound upon the disc members 152. The cord 108 accordingly does not collect on the disc members 152 (e.g., the cord 108 does not overlap at the disc members 156), but instead is paid off from a location outside of the personal escape device 150 as will be described in further detail below. In one embodiment, the input port 166 and the output port 168 can be located on the same side of the pulley housing 164 such that the path of the cord 108 is substantially U-shaped. A self-tailoring mechanism 170 can be interposed between the input port 166 and the output port 168 and facilitate effective routing of the cord 108 through the pulley 152 (e.g., through the input port 166, around the central hub 160, and out of the output port 168).

When the cord 108 has slack and is initially withdrawn from the output port 168 (e.g., when a user begins descending from a building), the input port 166 and the self-tailoring mechanism 170 can cooperate to apply initial tension the cord 108 which draws the cord towards the central hub 160. As the cord 108 is drawn closer to the central hub 160 and is pulled deeper into the V-shaped groove 162, the lateral elongated projections 158 become increasingly embedded into the cord 108 thereby gripping the cord 108 to facilitate rotation of the disc members 152. As the disc members 152 rotate, eddy currents are produced between the magnet housing 103 and the stator assembly 106 which inhibits rotation of the disc members 152 thereby applying a braking force to the disc members 152. This braking force slows the unwinding of the cord 108 to accordingly slow a user's vertical descent.

It is to be appreciated that the cord 108 can be fed into the input port 166 from any of a variety of suitable payout devices. In one example, the cord 108 can be paid out from a bag that is attached to the user proximate the personal escape device 150 and that travels together with the user during descent. It is to be appreciated that any of a variety of other pulley arrangements are contemplated such as a capstan, a reel, or a sheave (e.g., a pulley block), for example.

In an alternative embodiment, the magnets 102, the magnet housing 103 and the stator assembly 106 illustrated in FIGS. 11-16 can be provided on opposite sides of a common shaft (e.g., 4) similar to the embodiment(s) disclosed in FIGS. 1-10B. In such an embodiment, the magnets 102, the magnet housing 103 and the stator assembly 106 on each side of the shaft (e.g., 4) can cooperate to impart braking force to the shaft (e.g., 4) when a cord (e.g., 8) is unwound therefrom.

EXAMPLES

Figure 22:
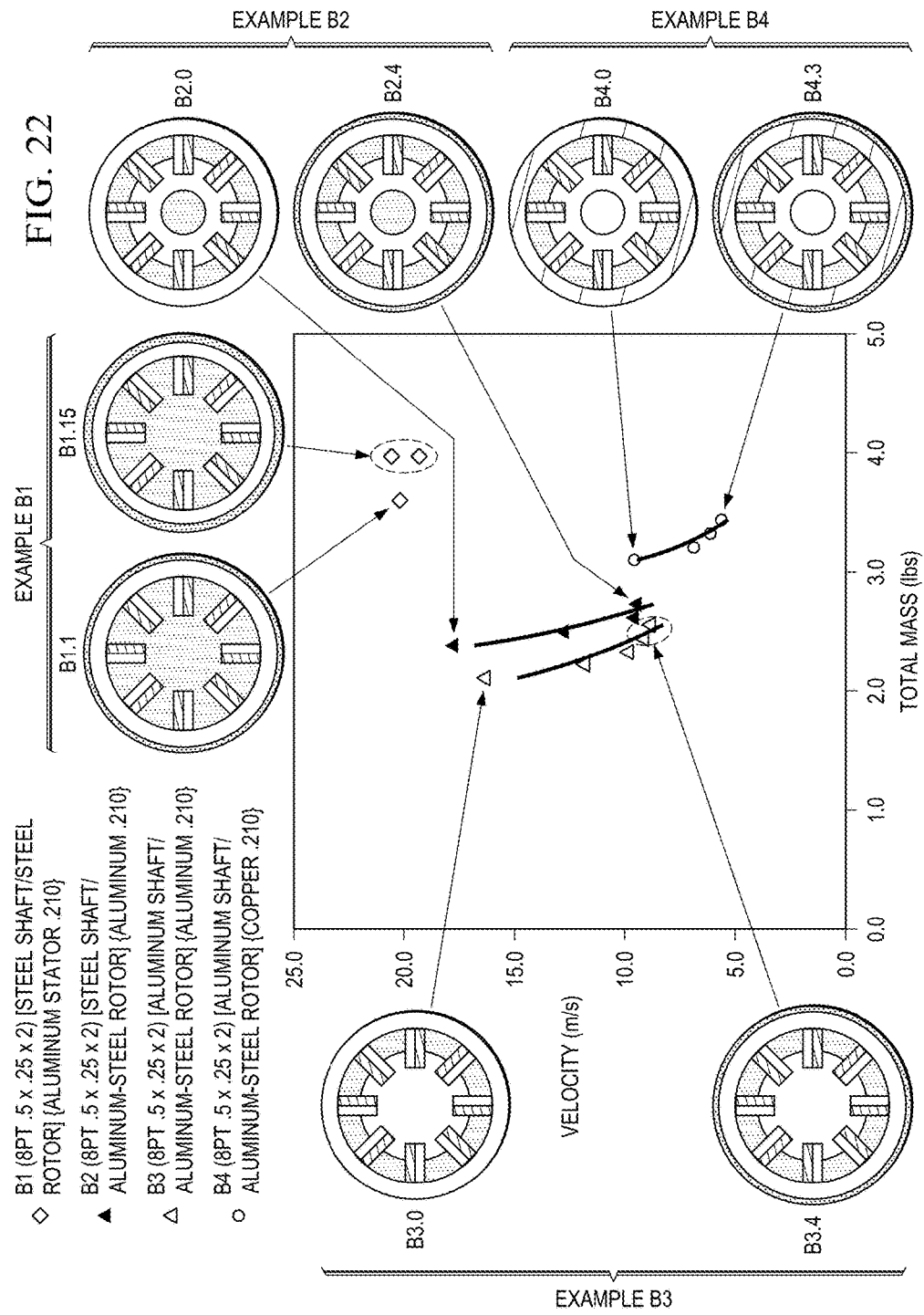
FIG. 22 is a plot depicting the results of testing of four different prototype personal escape devices.

Testing was conducted on four different prototype personal escape devices (B1, B2, B3, B4), the results of which are depicted in the plot of FIG. 22 that illustrates the relationship between the total mass imparted on the cord of each personal escape device and the resulting terminal descent velocity of the mass attached to the cord. Each prototype configuration had eight neodymium magnets (Grade N52) oriented to create 8 salient poles between magnet pairs. A 200 pound payload and frictionless line payout were assumed.

The descent velocity was calculated using the following equation:

$$v(t) = \frac{mg}{b}\left(1 - e^{\frac{-bt}{m}}\right) + v_i e^{-bt}$$

which is the closed form solution to the differential equation representing a falling payload retarded by a rotary damping element. The damping coefficient (e.g. relationship between input speed and output torque) was measured directly by a dynamometer.

Example B1 was comprised of an all steel rotor, steel shaft, aluminum stator, and back iron of various thicknesses. Example B1.1 had a back iron thickness of about 0.1 inch, and Example B1.15 had a back iron thickness of about 0.15 inch. Increasing the back iron thickness from about 0.1 inch to about 0.15 inch further improves the permeability of magnetic flux, resulting in a slight improvement in the descent velocity.

Example B2 was comprised of aluminum and steel rotor, steel shaft, aluminum stator, and back iron of various thicknesses. Example B2.0 had no back iron, and Example B2.1had about 0.02 inch of back iron, B2.2 had about 0.04 inch of back iron, and B2.3 had about 0.06 inch of back iron. In this configuration, the rotor hub material is aluminum. Aluminum has a very low magnetic permeability which forces more magnetic flux through the stator, accounting for the significant performance improvement over B1, which had an all steel rotor. Improvements in performance are achieved going from about 0.0 inch of back iron to about 0.04 inch of back iron. Only marginal performance gains are achieved at back iron thickness of about 0.06 inch and greater because the back iron is no longer saturated at thickness near about 0.06 inch.

Example B3 is comprised of aluminum and steel rotor, aluminum shaft, aluminum stator, and back iron of various thicknesses. B3.0 has no back iron. B3.1 has about 0.02 inch of back iron, B3.2 has about 0.04 inch of back iron, and B3.3 has about 0.06 inch of back iron. In this configuration, both the rotor hub and shaft material is aluminum. The addition of the Aluminum shaft directs slightly more magnetic flux through the stator, resulting in a slight improvement in performance relatives to B2, which had a steel shaft. Similar to B2, dramatic improvements in performance are achieved going from about 0.0 inch of back iron to about 0.04 inch of back iron. Again, only marginal performance gains are achieved at back iron thickness of about 0.06 inch and greater because the back iron is no longer saturated.

Example B4 is comprised of aluminum and steel rotor, aluminum shaft, copper stator, and back iron of various thicknesses. B3.0 has no back iron, and B3.1 has about 0.02 inch of back iron, B3.2 has about 0.04 inch of back iron, B3.3 has about 0.06 inch of back iron. In this configuration, both the rotor hub and shaft material is aluminum. The addition of the Aluminum shaft directs slightly more magnetic flux through the stator, resulting in a slight improvement in performance relatives to B2, which had a steel shaft. Similar to B2, dramatic improvements in performance are achieved going from about 0.0 inch of back iron to about 0.04 inch of back iron. Again, only marginal performance gains are achieved at back iron thickness of about 0.06 inch and greater because the back iron is no longer saturated.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

In various embodiments disclosed herein, a single component can be replaced by multiple components and multiple components can be replaced by a single component to perform a given function or functions. Except where such substitution would not be operative, such substitution is within the intended scope of the embodiments.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

What is claimed is:

1. A personal escape device comprising:
a main housing;
a shaft rotatably coupled with the main housing and rotatable about a rotational axis;
a magnet housing positioned in the main housing and coupled with the shaft such that the magnet housing rotates together with the shaft;
a plurality of magnets coupled with the magnet housing such that the plurality of magnets rotates together with the magnet housing;
a stator assembly coupled with the main housing and surrounding the magnet housing, the stator assembly and magnet housing being radially spaced from each other to define an air gap therebetween;
a pulley attached to the shaft and comprising a pair of disc members that are coupled together and cooperate with each other to define a groove; and
a cord disposed in the groove and only partially wound upon the disc members, wherein:
each magnet has a flux density;
at least a portion of the magnet housing is interposed between each magnet and an adjacent magnet of the plurality of magnets;
the portion of the magnet housing that is interposed between each magnet and an adjacent magnet of the plurality of magnets is configured to transmit substantially the entirety of the flux density from each magnet to the stator;
each disc member comprises:
an internal surface;
a plurality of lateral elongated projections extending upwardly from the internal surface; and
a central hub, wherein the lateral elongated projections extend substantially tangentially from the central hub and wherein the internal surface is substantially convex shaped such that the profile of each lateral elongated projection is crowned as it extends away from the central hub;
rotation of the disc members facilitates dispensation of a portion of the cord from the disc members; and
with the disc members sandwiched together, the internal surfaces of the disc members face each other such that the lateral elongated projections are configured to become embedded into the cord.

2. The personal escape device of claim 1 wherein the magnet housing comprises a hub and a rotor that are each formed of a metal and cooperate to retain a plurality of magnets.

3. The personal escape device of claim 2 wherein the hub is formed of a non-ferrous material.

4. The personal escape device of claim 1 wherein the stator assembly comprises a stator and a back iron, the back iron being sandwiched between the stator and the main housing.

5. The personal escape device of claim 4 wherein the stator is formed of a non-ferrous material and the back iron is formed of a ferrous material.

6. The personal escape device of claim 1 wherein the plurality of magnets comprise eight magnets.

7. The personal escape device of claim 1 wherein:
the magnet housing comprises a hub and a rotor that are each formed of a metal and cooperate to retain a plurality of magnets; and
the stator assembly comprises a stator and a back iron, the back iron being sandwiched between the stator and the main housing.

8. The personal escape device of claim 7 wherein:
the hub is formed of a non-ferrous material;
the stator is formed of a non-ferrous material; and
the back iron is formed of a ferrous material.

9. The personal escape device of claim 8 wherein the plurality of magnets comprises eight magnets.

10. A personal escape device comprising:
a main housing;
a shaft rotatably coupled with the main housing and rotatable about a rotational axis;
a magnet housing positioned in the main housing and coupled with the shaft such that the magnet housing rotates together with the shaft;
a plurality of magnets coupled with the magnet housing such that the plurality of magnets rotates together with the magnet housing;
a stator assembly coupled with the main housing and surrounding the magnet housing, the stator assembly and magnet housing being radially spaced from each other to define an air gap therebetween;
a pulley attached to the shaft and comprising a pair of disc members that are coupled together and cooperate with each other to define a groove; and
a cord disposed in the groove and only partially wound upon the disc members, wherein:
each magnet of the plurality of magnets has an axis of polarization;
each magnet of the plurality is arranged such that the axis of polarization is oriented tangentially with respect to the axis of rotation of the shaft;
each disc member comprises:
an internal surface;
a plurality of lateral elongated projections extending upwardly from the internal surface; and
a central hub, wherein the lateral elongated projections extend substantially tangentially from the central hub and wherein the internal surface is substantially convex shaped such that the profile of each lateral elongated projection is crowned as it extends away from the central hub;

rotation of the disc members facilitates dispensation of a portion of the cord from the disc members; and with the disc members sandwiched together, the internal surfaces of the disc members face each other such that the lateral elongated projections are configured to become embedded into the cord.

11. The personal escape device of claim 10 wherein the magnet housing comprises a hub and a rotor that are each formed of a metal and cooperate to retain a plurality of magnets.

12. The personal escape device of claim 11 wherein the hub is formed of a non-ferrous material.

13. The personal escape device of claim 10 wherein the stator assembly comprises a stator and a back iron, the back iron being sandwiched between the stator and the main housing.

14. The personal escape device of claim 13 wherein the stator is formed of a non-ferrous material and electrically conductive back iron is formed of a ferrous material.

15. The personal escape device of claim 10 wherein at least a portion of the magnet housing is interposed between each magnet and an adjacent magnet of the plurality of magnets.

16. The personal escape device of claim 10 wherein:

the magnet housing comprises a hub and a rotor that are each formed of a metal and cooperate to retain a plurality of magnets; and the stator assembly comprises a stator and a back iron, the back iron being sandwiched between the stator and the main housing.

17. The personal escape device of claim 16 wherein:

the hub is formed of a non-ferrous material;

the stator is formed of a non-ferrous material; and the back iron is formed of a ferrous material.

18. The personal escape device of claim 17 wherein the plurality of magnets comprises eight magnets.

* * * * *